United States Patent
Silbey et al.

(10) Patent No.: US 8,869,044 B2
(45) Date of Patent: Oct. 21, 2014

(54) RELOCATING A USER'S ONLINE PRESENCE ACROSS VIRTUAL ROOMS, SERVERS, AND WORLDS BASED ON LOCATIONS OF FRIENDS AND CHARACTERS

(75) Inventors: Marc Silbey, Mercer Island, WA (US); Shawn Clark, Kelowna (CA); Kevin Yockey, Kelowna (CA); Scott Lahay, Kelowna (CA)

(73) Assignee: Disney Enterprises, Inc., Burbank, CA (US)

( * ) Notice: Subject to any disclaimer, the term of this patent is extended or adjusted under 35 U.S.C. 154(b) by 329 days.

(21) Appl. No.: 13/283,435

(22) Filed: Oct. 27, 2011

(65) Prior Publication Data

US 2013/0111359 A1  May 2, 2013

(51) Int. Cl.
  *G06F 3/048* (2013.01)
  *G06Q 50/00* (2012.01)
  *G06Q 10/00* (2012.01)

(52) U.S. Cl.
  CPC ............... *G06Q 10/00* (2013.01); *G06Q 50/01* (2013.01)
  USPC ........................................................ 715/753

(58) Field of Classification Search
  CPC combination set(s) only.
  See application file for complete search history.

(56) References Cited

U.S. PATENT DOCUMENTS

| | | | | |
|---|---|---|---|---|
| 6,057,856 A | * | 5/2000 | Miyashita et al. | 345/633 |
| 6,091,417 A | * | 7/2000 | Lefkowitz | 715/854 |
| 6,219,045 B1 | * | 4/2001 | Leahy et al. | 715/757 |
| 6,311,195 B1 | * | 10/2001 | Hachiya et al. | 715/203 |
| 6,329,994 B1 | * | 12/2001 | Gever et al. | 345/473 |
| 6,414,677 B1 | * | 7/2002 | Robertson et al. | 345/419 |
| 6,437,777 B1 | * | 8/2002 | Kamachi et al. | 345/419 |
| 6,941,285 B2 | * | 9/2005 | Sarcanin | 705/67 |
| 2002/0021307 A1 | * | 2/2002 | Glenn et al. | 345/753 |
| 2003/0001846 A1 | * | 1/2003 | Davis et al. | 345/474 |
| 2008/0195724 A1 | * | 8/2008 | Gopinath | 709/220 |
| 2008/0207329 A1 | * | 8/2008 | Wallace et al. | 463/42 |
| 2008/0263460 A1 | * | 10/2008 | Altberg et al. | 715/757 |
| 2009/0158151 A1 | * | 6/2009 | Cheng et al. | 715/706 |
| 2009/0271289 A1 | * | 10/2009 | Klinger et al. | 705/26 |
| 2010/0030578 A1 | * | 2/2010 | Siddique et al. | 705/3 |
| 2011/0055734 A1 | * | 3/2011 | Borst et al. | 715/757 |
| 2012/0290433 A1 | * | 11/2012 | England et al. | 705/26.7 |

* cited by examiner

*Primary Examiner* — Phenuel Salomon
(74) *Attorney, Agent, or Firm* — Patterson & Sheridan LLP

(57) ABSTRACT

Techniques are disclosed that allow a user to efficiently move their online presence from a current location in a virtual world to a target location near a friend or character. The target location may be in another instance of the virtual world or in another virtual world. Further, the movement of the user—referred to as a jump—may be in response to a request from the user to jump their online presence to the target location of a friend or character. In the other direction, a user can send a "jump to me" request to their friends.

11 Claims, 7 Drawing Sheets

RELOCATING A USER'S ONLINE PRESENCE ACROSS VIRTUAL ROOMS, SERVERS, AND WORLDS BASED ON LOCATIONS OF FRIENDS AND CHARACTERS

BACKGROUND

1. Field

Embodiments presented in this disclosure generally relate to virtual environments. More specifically, embodiments of the invention are directed to techniques for automatically relocating users of virtual environment to locations near friends and characters.

2. Description of the Related Art

Multiplayer video games and virtual worlds have rapidly become popular forms of online entertainment. Both generally provide users with access to a virtual environment where they may interact with one another. Users control virtual likenesses to navigate the virtual environments. Such environments may be persistent where events occur and users interact with each other regardless of the presence of any particular user. Alternatively, such environments may be game or session based, e.g., where a group of users participate in a match of a first-person shooter game. Some virtual environments also provide characters that are not client users, but users provided by the online environment itself. Such characters may be controlled by a human actor or an automated bot. For example, users visiting a virtual amusement park may be greeted by parks mascots.

User interaction with other users and characters is often a prominent feature of these virtual environments. A user may, for example, meet and chat with other users/characters, or complete quests with other users/characters. It is not uncommon for a service provider hosting an online virtual environment to provide means for users to "friend" other users and to store the other users' screen names and information in "friends list." In some instances, the service provider may further indicate whether a given friend or character is online and the virtual environment location of the online friend or characters. In such a case, users can navigate the online environment to find a friend or character. Often, such navigation requires the user to manually traverse virtual rooms and it may further require the user to log out of one server and into a different server. This can be a time-consuming and frustrating experience, and the user may ultimately be unable to relocate to the friend or character's location in the virtual world (e.g., because the user gets lost or because the room the friend or character is in has access restrictions). Further, when a user and a friend/character are in different instances of a virtual world or in different virtual worlds, the user may be required to sign out of one world or instance of a world and into the other world or instance of a world.

SUMMARY

Embodiments of the invention provide approaches for moving a user's online presence from one location to another, e.g., to a target location in another virtual environment where a friend (or character or mascot) is located. One embodiment of the invention includes a method. This method may generally include determining, by operation of one or more processors, an online presence of a first user in a first virtual environment, identifying an online presence of at least a second user in a second virtual environment, and presenting an indication to the first user that a jump is available. The jump itself may be invoked to move the online presence of the first user from a current location within the first virtual environment to a target location in the second virtual environment. Additionally, the online presence of the second user is at the target location in the second virtual environment.

Another embodiment includes a computer-implemented method. This method may generally include determining, by operation of one or more processors, the online presence of a first user in a first virtual environment and identifying an online presence of at least a second user in a second virtual environment. This method may further include presenting the second user with a request from the first user to jump to a current location of the first user. The second user invokes the jump to move the online presence of the second user to the location of the online presence of the first user in the first virtual environment.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

When a user logs on to a given virtual environment, the server hosting that environment creates an online presence for that user. Doing so allows the user to interact at least with others who have an online presence near the location of the user in the virtual world. The user may also have a collection of friends (relationships to other users in a variety of online environments) stored in a "friends" or contact" list. Using the contents of a friends list, a monitoring system may identify whether a user's friends also have a current online presence in the virtual world (or a different instance of the virtual world or a different virtual world altogether). The system may also identify a target location in the virtual world (or in a different instance of the virtual world or a different virtual world) corresponding to the current position of a friend of the user.

Once identified, the virtual world interface may provide an indication that the user can "jump" his or her online presence to the target location, e.g., by presenting a "jump" button placed in the user's friend list. A "jump" relocates the user to the target location, eliminating the need for the user to navigate the virtual environment(s) in search of the friend. For example, to perform a "jump" across worlds the system may automatically reserve a position for the user in a destination world (also referred to herein as the "target" world), log the user out of the current world, log the user into the destination world, and create an online presence in the destination world near the friend (e.g., in the same "room" in the target world).

In addition to jumping to friends, the user may also be allowed to jump to characters and other entities. Further, the inverse of the "jump" functionality can be provided, namely the ability of users to request that others jump to them.

Figure 1:
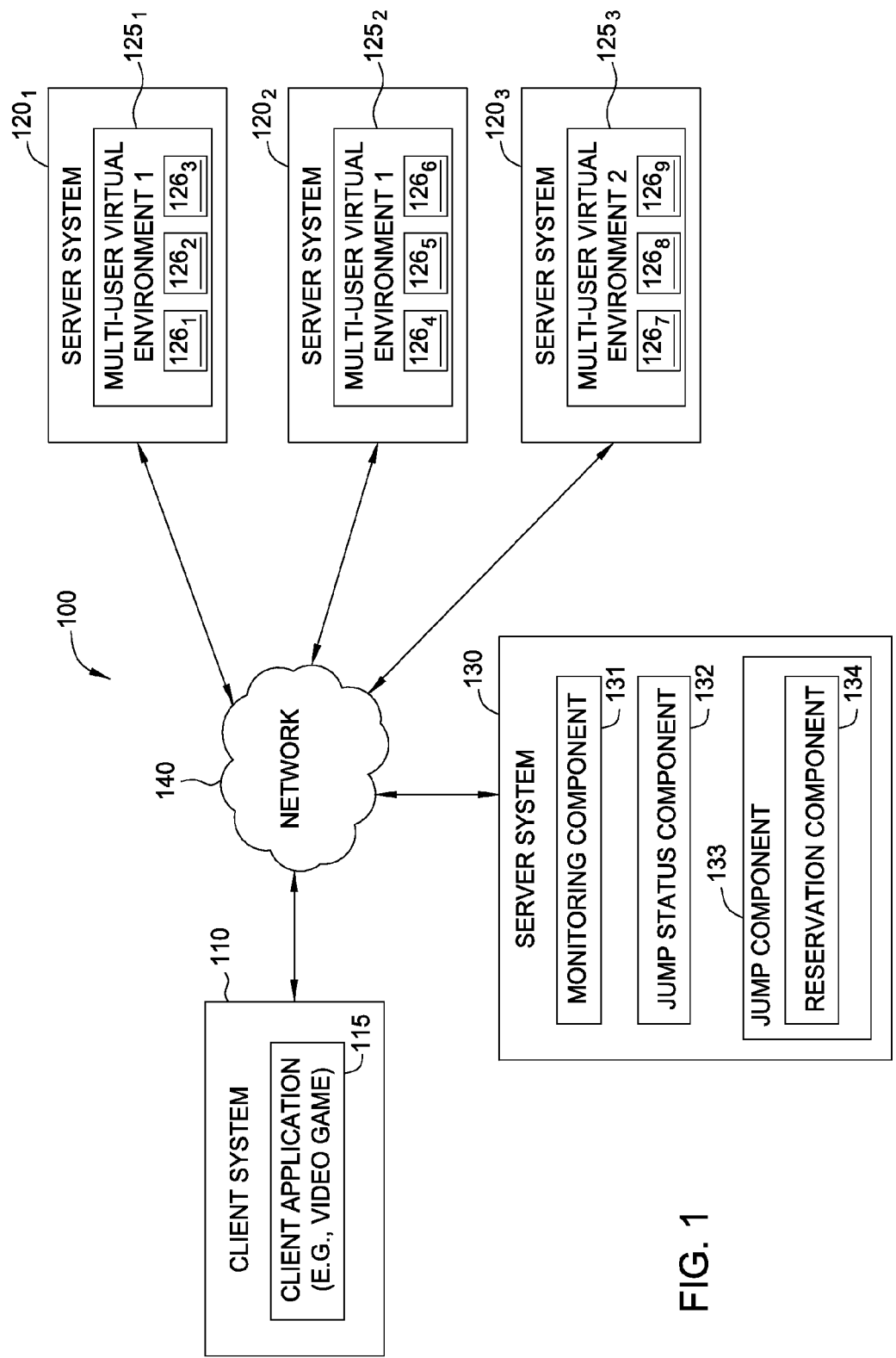
FIG. 1 is a block diagram illustrating a system configured to provide a virtual environment, according to one embodiment of the present invention.

FIG. 1 is a block diagram illustrating a system 100 configured to provide a virtual environment, according to one embodiment of the present invention. As shown, the system 100 includes a plurality of client systems 110 connected to server systems $120_{1-3}$ and server system 130 via a network 140. Each client system 110 is configured to execute a virtual environment client application 115. Examples of client systems 110 include, without limitation, console gaming systems, handheld gaming systems, personal computer systems, tablet and mobile computing devices, etc.

Each server system $120_{1-3}$ is configured to operate a multi-user virtual world $125_{1-3}$. Generally, the servers $120_{1-3}$ are configured to receive connections from users and to manage interactions between users. Further, the servers $120_{1-3}$ can serve the same or different virtual worlds. As shown, servers $120_{1-2}$ provide access to a first virtual world $125_{1-2}$ and server $120_3$ provides access to a second world $125_3$. Each world may provide an instance of the same general virtual environment, with a collection of virtual "rooms" $126_{1-9}$ or locations for users to explore and experience. Although illustrated as separate server systems $120_{1-3}$ each hosting a virtual world or virtual world instance $125_{1-3}$, server systems $120_{1-3}$ may be configured to host multiple instances of a given virtual environment multiple instances of different virtual environments.

Illustratively, server system 130 includes a monitoring component 131, a jump status component 132, and a jump component 133. In one embodiment, the monitoring component 131 is configured to track a variety of user activities. For example, the monitoring component 131 may track whether a user is logged into a server, which server the user is logged into, what world the user is in, and where in the world the user is located. By monitoring user activity, the server can determine, among other things, the locations of a user and the user's friends. The server system 130 can then determine, based in part on the foregoing locations, whether jumping should be allowed. The jump status component 132 determines whether a jump can be made by one user to another based on predefined conditions. For example, in some cases the user and the user's friend may already be in the same room, or the room $126_{1-9}$, server $120_{1-3}$, or world $125_{1-3}$ the friend is in or on may be full. In other cases, the room $126_{1-9}$, server $120_{1-3}$, or world $125_{1-3}$ may have access restrictions, such as a membership requirement. In the foregoing cases, the jump status component might determine that a jump cannot currently be performed. The jump component 133 provides software that enables a user to jump from one room $126_{1-9}$ to another, one server $120_{1-3}$ to another, and/or one world $125_{1-3}$ to another. For example, a user in one online environment with an online presence represented as a penguin character may, by clicking on a "jump" button, activate the jump component 133. Assuming the jump is across worlds, the jump component 133 might then remove the user from the current virtual world and place the user at a location within a destination virtual world, where the user may cease to be a penguin and become a different virtual creature or person, as appropriate for the target virtual environment.

In one embodiment, the jump component 130 may include a reservation component 134. The reservation component 130 reserves a position at the target location before a jump is made. In practice, reservations may be made in the destination location's world $125_{1-3}$, server $120_{1-3}$, and/or room $126_{1-9}$, depending on whether the jump is across worlds, across servers, or across rooms, respectively. By reserving, the reservation component 134 guarantees that the jump will not be interrupted by the world, server, or room later becoming full or otherwise unavailable to the user. Although embodiments are described herein with reference to a single server system 130 containing the components 130-133, and the reservation component 134 is described as being a part of the jump component 130, embodiments may be implemented where these components are split between servers rather than on the same server. Further, the components for monitoring user activity, presenting available jumps, and requests for jumps, may be integrated with the virtual world servers.

Figure 2:
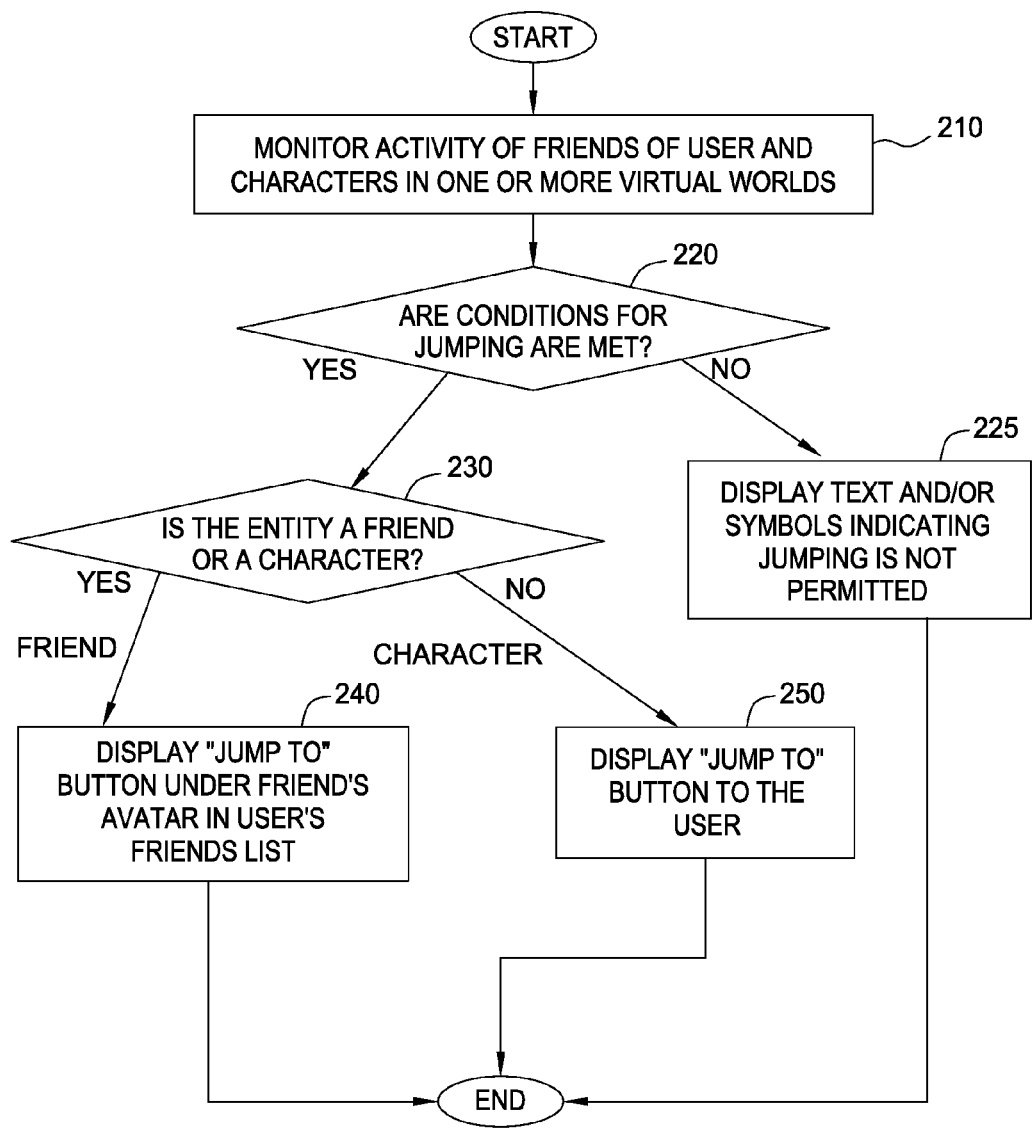
FIG. 2 illustrates a method for generating a "jump" button, according to one embodiment of the invention.

FIG. 2 is a flow diagram illustrating a method 200 for generating a "jump" button presented in a user's friends or contact list, according to one embodiment of the invention. As shown, the method 200 begins at step 210, where the monitoring component 131 monitors the activity of a friend or character in one or more worlds. As described above, the monitoring process may include tracking whether the friend or character is logged into a server, which server the friend or character is logged into, what world the friend or character is in, and where in the world the friend or character is located.

At step 220, the jump status component 133 determines if the conditions for jumping are met. As noted above, such conditions may involve the server load of the server the friend or character is on; whether the room $126_{1-9}$, server $120_{1-3}$, or world $125_{1-3}$ the other user is in or on is full; and access restrictions of the room $126_{1-9}$, server $120_{1-3}$, or world $125_{1-3}$ the other friend or character is in or on. If the conditions for the user to jump are not met, the user may be notified at step 225. For example, the user may be shown text and/or a symbol or symbols indicating that jumping is not currently permitted. Otherwise, at step 230 the jump status component determines whether the available "jump" is to a friend in the user's friend list or to a character. If the jump status component identifies the jump as being to one of the user's friends, then at step 240, the client component may update the interface or display of the user's friends list to indicate the available jump. For example, a button, icon, or symbol may be displayed proximate to the image of the friend of the user in the friends list. On the other hand, where the jump status component identifies an available jump to a character (and the character is not also a friend), then at step 250, the client component may display a "jump" button for the character at a location other than the user's friends list. For example, the "jump to" button may be displayed along with a picture and description of the character in a visible place on the user's application interface.

Other embodiments are broadly contemplated. For example, the interface presented to the user may display a map of the virtual environment indicating where friends and characters are located, as well "jump" buttons for jumping to the friends and characters.

In some embodiments, only buttons for available jumps are displayed. That is, the client component does not display text and/or symbols 225 indicating that jumping is not permitted. Instead, the client component may indicate when jumping is not permitted. In short, the client component might present jumping as a default option that is always available unless otherwise indicated.

Figure 3:
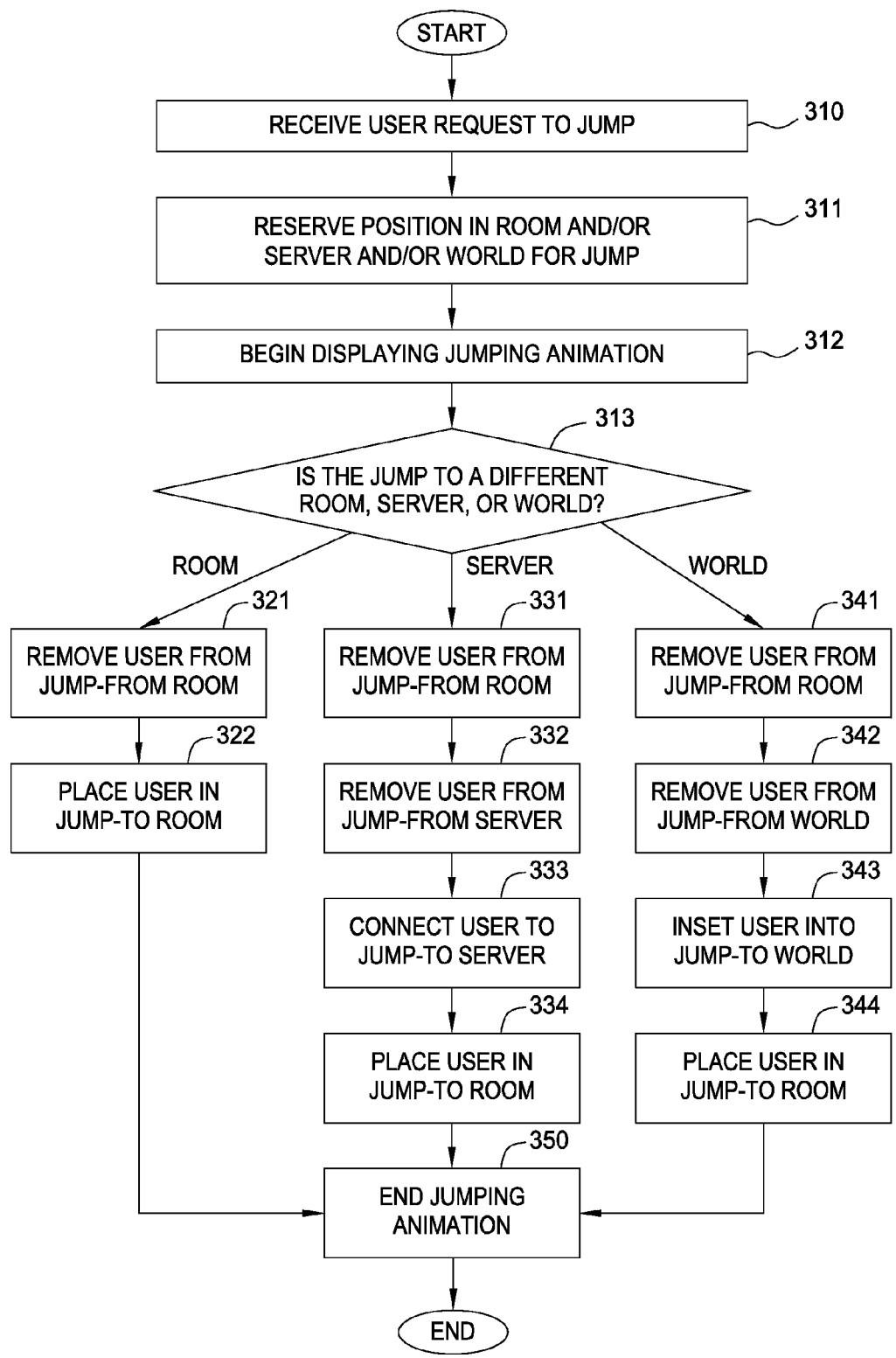
FIG. 3 is illustrates a method for moving a user's online presence from a current location to a target location, according to one embodiment of the invention.

FIG. 3 illustrates a method 300 for moving the online presence of a user from a current location to a target location, according to one embodiment of the invention. At step 310, the user initiates a jump (by, for example, pressing a jump button). At step 311, the reservation component reserves a position in the room, server, world, or some combination thereof, that is being jumped to. Reserving a position might entail, for example, sending a signal to another server (if the jump is across servers) to indicate a request to join the server. Then, a signal may be received from the server indicating whether the reservation was successfully made. Assuming a successful reservation, a jump animation is displayed to the user and/or others in the room, server, and/or world at step 312. For example, the animation may depict the user flying out of a room using a jet pack. Then, at step 313, jump component 130 determines whether the jump requires relocating to a different room or if it further requires relocating to a different server and/or world. If the jump is simply to a different room, then, at steps 321-322, the user is removed from the current room and placed into the destination room. For example, a user may be removed from a virtual town center and relocated to the town's fringes via a jump. If the target location of the jump is on a different server, the user is removed from the current room at 331, removed (for example, by logging out of) from the current server at 332, connected to the destination server (for example, by being logged in to it) at 333, and placed in the destination room. Likewise, if the jump requires switching worlds, the user is removed from the current room at 33 and removed (for example, by signing out of) the current world at 332. At step 333, an online presence for the user is created in the destination world, and the user is placed in the destination room. At step 350, the jump animation ends.

In at least some embodiments, the user is placed in the destination virtual environment at a location near the friend (or character). Near can mean within the same room or within such proximity that the user need not spend much time finding the friend or character. For example, the user may be placed at the same position that the user would ordinarily enter a destination room, or the user may be placed in a location where, more often than not, it requires less than one minute for the user to find the friend. Further, when a user requests to jump to the location of a character, the character may have online presences in multiple instances of a given virtual environment. Under these circumstances, the system may select an instance with the fewest other users nearby, with the most friends of the user, or using any other criteria suitable.

In one embodiment, both the user and other users in the virtual world can see the jumping animation. In alternative embodiments, only the user or only other users can see the jumping animation. In some embodiments, the animation consists of at least one animation for jumping out of the original room and at least one other animation for jumping into the destination room. Further, although the embodiments are principally described herein with reference to rooms, servers, and worlds, persons of ordinary skill in the art will recognize that the invention applies equally to jumping to locations generally, and therefore covers embodiments where a room-server, server-world, room-world, and/or room-server-world distinction cannot be drawn, as well as to embodiments that lack the notion of room, world, server, or some combination of the foregoing.

In at least some embodiments, a jump between servers or worlds is facilitated by the server or world sharing a single authentication system. In such embodiments, neither the user nor the automated jump method needs to log out of one server or world and log back in to another server or world because the user's credentials are accepted by both servers or worlds.

In at least some embodiments, the user may be shown an error window or message if the jump as described above does not, for any reason, complete successfully. Further, the user may be returned to a predefined location when the jump does not succeed. Predefined locations may include, but are not limited to, the location jumped out of, the main landing page for the client application from which the user may choose which server to enter, or a special jump error page.

In at least some embodiments, an error window or message (e.g., "Sorry, this room is currently full") may also be displayed if a reservation at step 311 is not successfully made. Under these circumstances, the "jump to" button of the friend or character may be switched to text and/or symbols indicating jumping to the friend or character is not available. In some embodiments, the user is later notified when the friend or character becomes available again to be jumped to.

Figure 4:
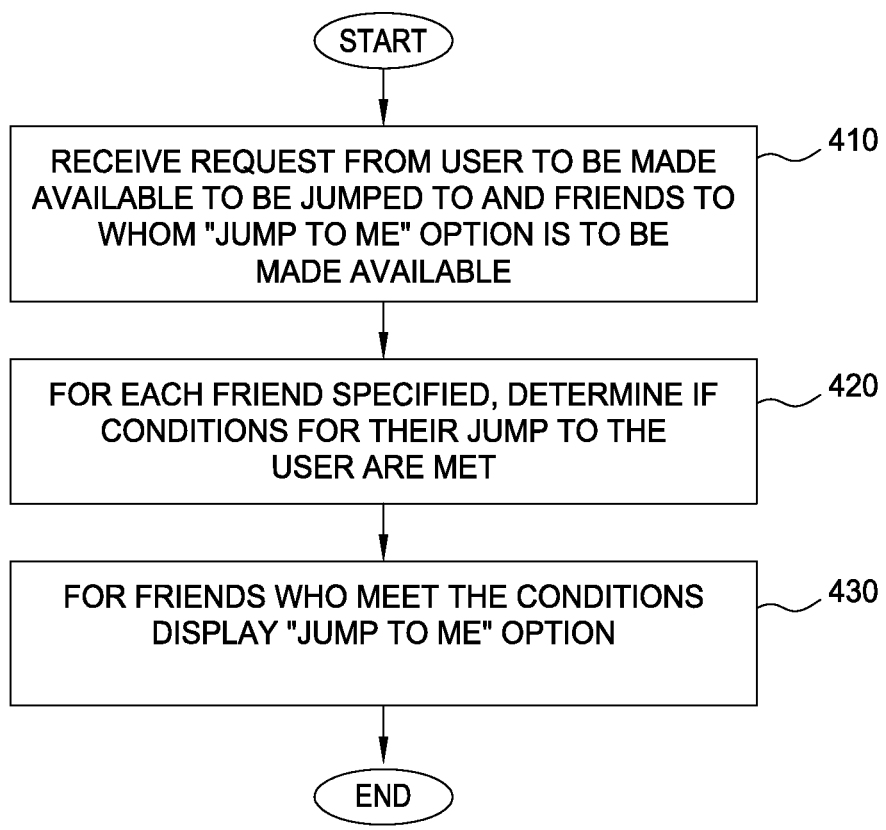
FIG. 4 illustrates a method for generating a "jump to me" button, according to one embodiment of the invention.

FIG. 4 illustrates a method for generating a "jump to me" button. The "jump to me" button is the inverse of the "jump" button described above. That is, the "jump to me" button may be used to send a request to a user's friend that they "jump" their virtual location near that of the requesting user. As shown, the method 400 begins at step 410 after receiving a user request that a "jump to me" option be made available to one or more friends specified by the user, including friends in a different room $126_{1-9}$, server $120_{1-3}$, and/or world $125_{1-3}$. At step 420, the jump status component 132 determines whether the conditions for the friends' to jump to the user are met. Such conditions may involve, but are not limited to, the capacity of the server load of the server the user is on; whether the room $126_{1-9}$, server $120_{1-3}$, or world $125_{1-3}$ the user is in or on is full; and special conditions (e.g., membership requirements) for entry into the room $126_{1-9}$, server $120_{1-3}$, or world $125_{1-3}$ the user is in or on. At step 430, a "jump to me" option or button is displayed to every selected friend for whom a jump would meet all predefined conditions.

Although the foregoing embodiment is described with reference to friends, "jump to me" capabilities for characters and other entities are also envisioned. Further, although the user is described above as initiating creation of the "jump to me" button, the button could also be generated on the basis of an automated request by, for example, an automated character or entity. In addition, at least some embodiments envision that creating the "jump to me" button automatically initiates a jump for the targeted friend, character, or entity, which may then be canceled by the targeted friend, character, or entity.

Figure 5:
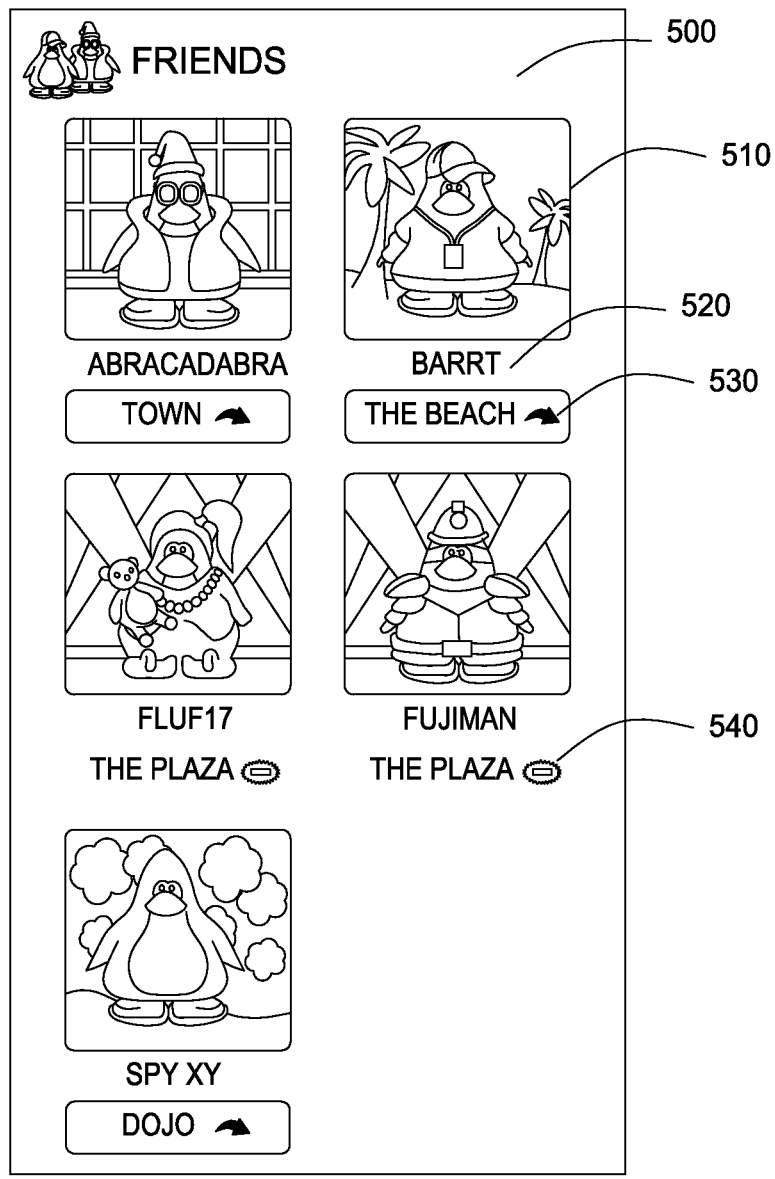
FIG. 5 depicts an example friends list and a configuration of the friends' avatars, names, and "jump" buttons in the friends list, according to one embodiment of the invention.

FIG. 5 depicts a friends list and configuration of friends' avatars, names, and "jump" buttons in the friends list, according to one embodiment of the invention. As shown, a window 500 displays information and "jump to" buttons for a plurality of friends associated with the user. For example, an avatar 510 includes a picture depicting the friend's appearance in the virtual world. The friend's name 520 is displayed below the avatar 510. In some embodiments, the avatar 510 is animated and may display more than an image of the character. For example, "jump" button 530 includes the name of the location that can be jumped to by pressing the button, as well as an arrow symbol indicating that the jump functionality is currently available. Pressing the "jump" button 530 results in the system moving the online presence of the user from its current location to a location near the location of the friend. In contrast, locations that currently cannot be jumped to, as determined by the method according to FIG. 2, are depicted as grayed text and a "no" symbol 540. This provides a clear indication to the user that jumping is not currently permitted.

In one embodiment, monitoring component 131 may update the "jump to" buttons 530, which monitors the actions of the user's friends, based on the availability of a jump between the user and one of their friends (as determined by the jump status component 132). For example, the monitoring component 131, may provide data to the jump status component 132, which determines if the conditions for jumping are met and therefore whether a "jump" button 530 or gray text with a "no" symbol 540 should be displayed. In an alternative embodiment, the avatar, name, and "jump" button may be combined in any possible permutation. Further, the friends list 500 or other display mechanism (e.g., the map described above) may display friends across not only instances of a virtual world (e.g., virtual world servers $125_{1-2}$), but also across virtual worlds (e.g., virtual worlds $125_{1-2}$ and $125_3$).

Figure 6:
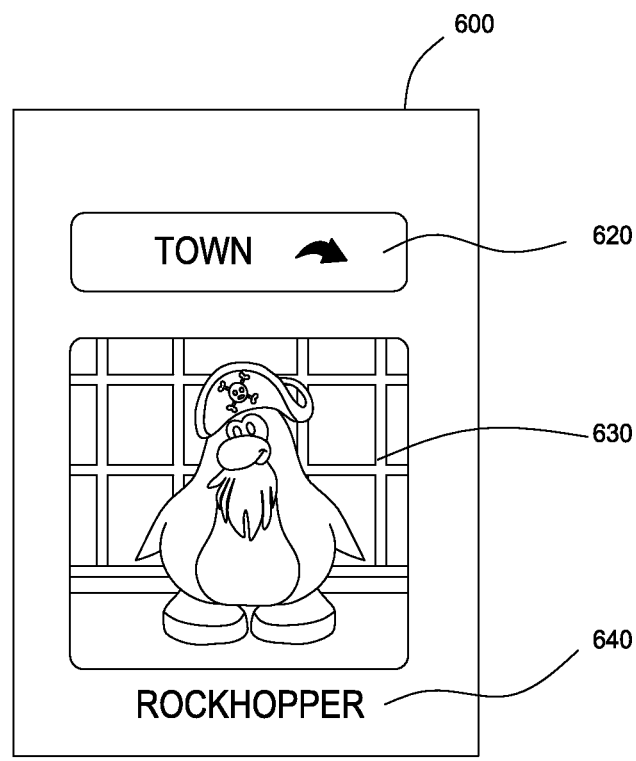
FIG. 6 depicts an example of a pop-up presenting a character's avatar, name, and a "jump" button, according to one embodiment of the invention.

FIG. 6 depicts a character pop-up and a character's avatar, name, and "jump" button in the pop-up, according to one embodiment of the invention. In some embodiments, a pop-up window 600 may be shown to the user when the character comes online. In alternative embodiments, the pop-up window 600 may be shown upon the occurrence of a predefined event. A predefined event may include, for example, the character beginning to tell stories to nearby users. The particular embodiment of the pop-up 600 depicted in FIG. 6 includes a character name 640 ("Rockhopper"), an avatar 630, and a "jump" button 620. One or a combination, or none, of these elements may appear in other embodiments. Further, in at least some embodiments, the avatar 630 is animated, and in some embodiments the avatar 630 may display more than the image of the character.

Note, multiple instances of the same in-game character or mascot (e.g., the "Rockhopper" character) may be present in a virtual environment (or in different instances of the virtual environment running on different servers). In such case, when a user requests a "jump" to the in game character or mascot, the system will select one of the multiple instances to jump the user to. For example, the system may evaluate whether any of the user's friends are present and have an online presence at the same distinct location where the mascot is present. In such a case, the system may "jump" the user to a location where both the mascot and the user's friends are present within the online environments. Of course, other approaches may be used.

Figure 7:
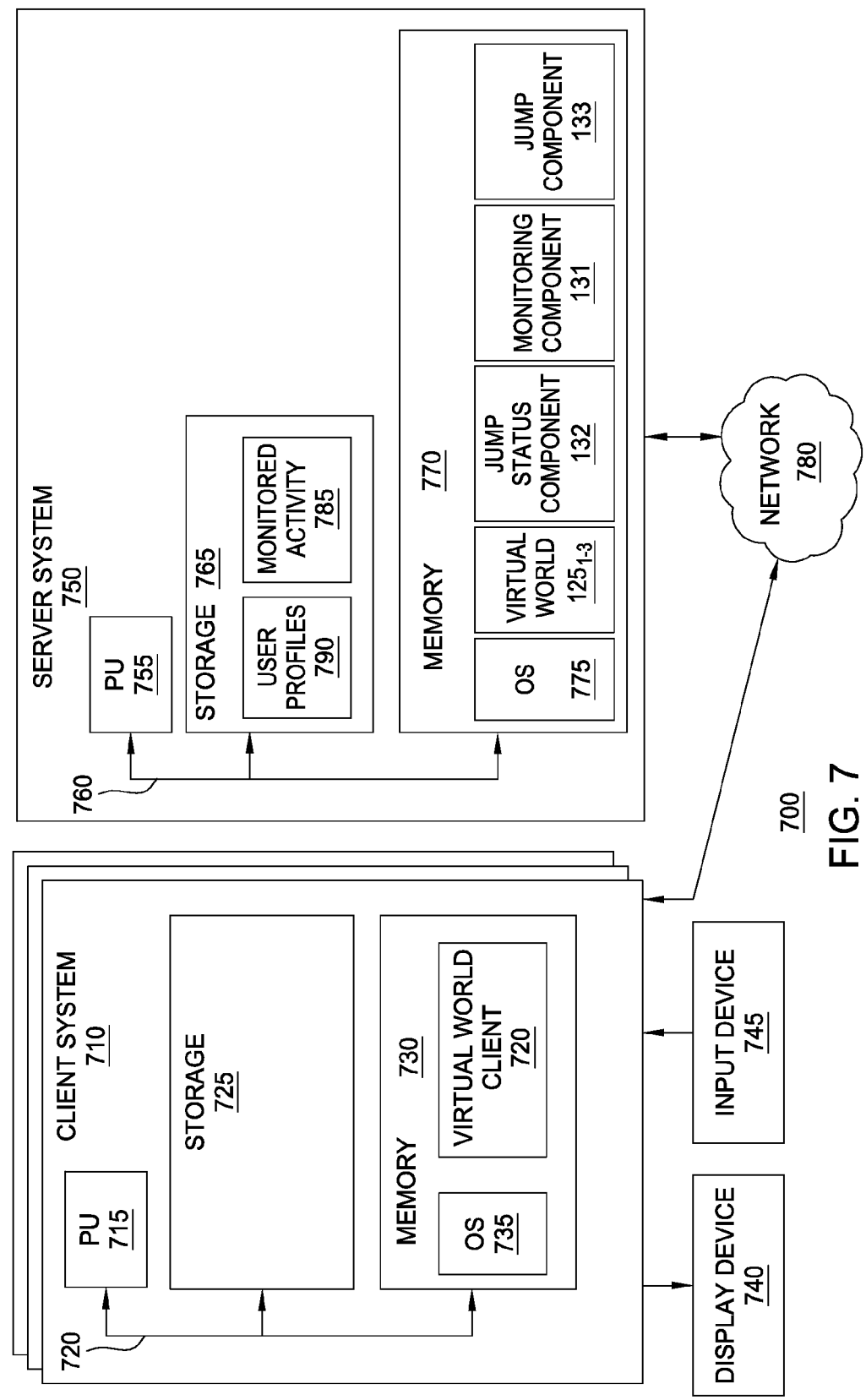
FIG. 7 illustrates a server computing system configured to provide a multiuser virtual environment, according to one embodiment of the invention.

FIG. 7 is a block diagram illustrating a system 700 configured to virtual environment, according to one embodiment of the invention. As shown, the system 700 includes a plurality of client systems 710 and a server system 750, communicatively coupled via a network 780. In one embodiment, the client systems 710 may include existing computer systems, e.g., desktop computers, server computers, laptop computers, tablet computers, gaming consoles, hand-held gaming devices and the like. The client systems 710 illustrated in FIG. 7, however, are merely examples of computer systems in which embodiments of the present invention may be used.

As shown, each client system 710 includes, without limitation, a processor 715, which obtains instructions and data via a bus 720 from a memory 730 and storage 725. Processor 715 is a programmable logic device that performs instruction, logic, and mathematical processing, and may be representative of one or more CPUs. Storage 725 is representative of hard-disk drives, flash memory devices, optical media and the like. Generally, the storage 725 stores application programs and data for use by the client system 710. The client systems 710 are operably connected to the network 780, e.g., via network interfaces.

The memory 730 is any memory sufficiently large to hold the necessary programs and data structures. Memory 730 could be one or a combination of memory devices, including Random Access Memory, nonvolatile or backup memory (e.g., programmable or Flash memories, read-only memories, etc.). Illustratively, the memory 730 includes the virtual world client 120 and an operating system ("OS") 735. Operating system 735 is software used for managing the operation of the client system 710. Examples of OS 735 include UNIX, versions of the Microsoft Windows® operating system and distributions of the Linux® operating system. Additional examples of OS 735 include custom operating systems for gaming consoles, including the custom operating systems for systems such as the Microsoft Xbox 360®, Nintendo WH® and Sony PlayStation® 3 consoles.

Additionally, the client systems 710 each are coupled to display devices 740 and input devices 745. The display devices 740 may include output devices such as monitors, touch screen displays, and so on. For instance, the display devices 740 may include a display device used to visually depict a virtual environment. As an example, the display 740 may provide a touch sensitive surface allowing the user to select different locations within the virtual environment and control the movement of an avatar within the virtual environment. The input devices 745 represent a wide variety of input devices, including keyboards, mice, controllers, and so on. Furthermore, the input devices 745 may include a set of buttons, switches or other physical device mechanisms for controlling the client system 710. For example, the input devices 745 could include a set of directional buttons used to navigate an avatar through a virtual environment presented on the display 740.

As shown, the server system 750 includes, without limitation, a processor 755, which obtains instructions and data via a bus 760 from a memory 770 and storage 765. Processor 755 is a programmable logic device that performs instruction, logic, and mathematical processing, and may be representative of one or more CPUs. Storage 765 is representative of hard-disk drives, flash memory devices, optical media and the like. Generally, the storage 765 stores application programs and data for use by the server system 750. The server system 750 is connected to the network 780, e.g., via a network interface.

The memory 770 is any memory sufficiently large to hold the necessary programs and data structures. The memory 770 includes an operating system ("OS") 775 and a server hosting a virtual environment $125_{1-3}$, a monitoring component 131, a jump status component 132, and a jump component 133. In some embodiments however, the virtual world $125_{1-3}$, monitoring component 131, jump status component 132, and jump component 133 are stored separately in the memory of at least two or more server systems 750, rather than stored in the memory of a single server 750. Further embodiments may lack one or more, or combine one or more, of the virtual world $125_{1-3}$, monitoring component 131, jump status component 132, and jump component 133. The storage 765 of the server system 750 stores at least the user profiles 790 and monitored activity 785 of the virtual world $125_{1-3}$. User profiles 790 may include avatar photos and animations, user name, and password. Examples of monitored activity 785 include time stamps recording the times when users log in and out, user location within, and other information pertaining to user interactions in, one or more virtual worlds $125_{1-3}$.

Advantageously, embodiments of the invention provide an approach for moving a user's online presence from a current location in a multi-user virtual environment to a target location near a friend or character. The target location may be within the same virtual world, in another instance of the virtual world, or in another virtual world. Further, the movement of the user—referred to as a jump—may be in response to a request by the user to jump. One embodiment indicates whether "jumping" to another user or character is permitted by displaying a "jump" button in the user's friend's list for friends, and in a visible place on the application interface for characters. Yet another embodiment includes a technique for a user to indicate to one or more friends that the user wishes to be "jumped to."

However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the foregoing is directed to embodiments of the present invention, other and further embodiments of the invention may be devised without departing from the basic scope thereof, and the scope thereof is determined by the claims that follow.

What is claimed is:
1. A computer-implemented method, comprising:
    determining, by operation of one or more processors, an online presence of a first user in a first virtual environment;

identifying an online presence of at least a second user in a second virtual environment;

determining whether a precondition for jumping the first user is satisfied, the precondition specifying at least one of a capacity limit or one or more requirements for entry into a virtual room, virtual world instance, or virtual world in which the online presence of the second user is located; and if the precondition is satisfied, reserving a position for the first user in the second virtual environment and presenting an indication to the first user that a jump is available, wherein the jump is invoked to move the online presence of the first user from a current location within the first virtual environment to a target location in the second virtual environment, and wherein the online presence of the second user is at the target location in the second virtual environment, and wherein:
the first virtual environment comprises a first room in a virtual world and the second virtual environment comprises a second room in the virtual world, the first virtual environment comprises a first instance of a virtual world, the second virtual environment comprises a second instance of the virtual world, and the first instance of the virtual world and the second instance of the virtual world share a common authentication system such that the second instance of the virtual world validates authentication credentials associated with the first user as part of the lump without requiring the first user to present authentication credentials to the second instance of the virtual world, or the first virtual environment comprises a first virtual world, the second virtual environment comprises a second virtual world, and the first virtual world and the second virtual world share a common authentication system such that the second virtual world validates authentication credentials associated with the first user as part of the lump, without requiring the first user to present authentication credentials to the second virtual world.

2. The computer-implemented method of claim 1, wherein the indication to the first user is presented in a friends list of the first user.

3. The computer-implemented method of claim 1, wherein the second user is a character provided by the second virtual environment.

4. The computer implemented method of claim 3, wherein the character is one of a plurality of instances of the character, each at a distinct location in an instance of the second virtual environment, and wherein the target location is selected based on the online presence of one or more users associated with the first user then present at one of the distinct locations.

5. The computer-implemented method of claim 1, further comprising:
receiving a request from the first user to jump to the target location; and
moving the online presence of the first user to the target location.

6. A non-transitory computer-readable storage medium storing a program, which, when executed by a processor performs an operation for facilitating communication between users, the operation comprising:
determining, by operation of one or more processors, an online presence of a first user in a first virtual environment;

identifying an online presence of at least a second user in a second virtual environment;

determining whether a precondition for jumping the first user is satisfied, the precondition specifying at least one of a capacity limit or one or more requirements for entry into a virtual room, virtual world instance, or virtual world in which the online presence of the second user is located; and if the precondition is satisfied, reserving a position for the first user in the second virtual environment and presenting an indication to the first user that a jump is available, wherein the jump is invoked to move the online presence of the first user from a current location within the first virtual environment to a target location in the second virtual environment, and wherein the online presence of the second user is at the target location in the second virtual environment, and wherein:
the first virtual environment comprises a first room in a virtual world and the second virtual environment comprises a second room in the virtual world, the first virtual environment comprises a first instance of a virtual world, the second virtual environment comprises a second instance of the virtual world, and the first instance of the virtual world and the second instance of the virtual world share a common authentication system such that the second instance of the virtual world validates authentication credentials associated with the first user as part of the jump without requiring the first user to present authentication credentials to the second instance of the virtual world, or the first virtual environment comprises a first virtual world, the second virtual environment comprises a second virtual world, and the first virtual world and the second virtual world share a common authentication system such that the second virtual world validates authentication credentials associated with the first user as part of the jump, without requiring the first user to present authentication credentials to the second virtual world.

7. The computer-readable storage medium of claim 6, wherein the indication to the first user is presented in a friends list of the first user.

8. The computer-implemented method of claim 6, wherein the second user is a character provided by the second virtual environment.

9. The computer-readable storage medium of claim 6, the operation further comprising:
receiving a request from the first user to jump to the target location; and
moving the online presence of the first user to the target location.

10. A system, comprising:
a processor; and
a memory, wherein the memory includes an application program configured to perform an operation, the operation comprising:
determining, by operation of one or more processors, an online presence of a first user in a first virtual environment, identifying an online presence of at least a second user in a second virtual environment, determining whether a precondition for jumping the first user is satisfied, the precondition specifying at least one of a capacity limit or one or more requirements for entry into a virtual room, virtual world instance, or virtual world in which the online presence of the second user is located; and if the precondition is satisfied, reserving a position for the first user in the second virtual environment and presenting an indication to the first user that a jump is available, wherein the jump is invoked to move the online presence of the first user from a current location within the first virtual environment to a target location in the second virtual environment, and wherein the online presence of the second user is at the target location in the second virtual environment, and wherein:
the first virtual environment comprises a first room in a virtual world and the second virtual environment comprises a second room in the virtual world, the first virtual environment comprises a first instance of a virtual world, the second virtual environment comprises a second instance of the virtual world, and the first instance of the virtual world and the second instance of the virtual world share a common authentication system such that the second instance of the virtual world validates authentication credentials associated with the first user as part of the jump without requiring the first user to present authentication credentials to the second instance of the virtual world, or the first virtual environment comprises a first virtual world, the second virtual environment comprises a second virtual world, and the first virtual world and the second virtual world share a common authentication system such that the second virtual world validates authentication credentials associated with the first user as part of the jump, without requiring the first user to present authentication credentials to the second virtual world.

11. A computer-implemented method, comprising:

determining, by operation of one or more processors, an online presence of a first user in a first virtual environment;

identifying an online presence of at least a second user in a second virtual environment;

determining whether a precondition for jumping the second user is satisfied, the precondition specifying at least one of a capacity limit or one or more requirements for entry into a virtual room, virtual world instance, or virtual world in which the first user is located; and if the precondition is satisfied, reserving a position for the second user at the first virtual environment and presenting the second user with a request from the first user to jump to a current location of the online presence of the first user, wherein the second user invokes the jump to move the online presence of the second user to the location of the online presence of the first user in the first virtual environment and wherein:
the first virtual environment comprises a first room in a virtual world and the second virtual environment comprises a second room in the virtual world, the first virtual environment comprises a first instance of a virtual world, the second virtual environment comprises a second instance of the virtual world, and the first instance of the virtual world and the second instance of the virtual world share a common authentication system such that the first instance of the virtual world validates authentication credentials associated with the second user as part of the jump without requiring the second user to present authentication credentials to the first instance of the virtual world, or the first virtual environment comprises a first virtual world, the second virtual environment comprises a second virtual world, and the first virtual world and the second virtual world share a common authentication system such that the first virtual world validates authentication credentials associated with the second user as part of the lump, without requiring the second user to present authentication credentials to the first virtual world.

* * * * *

UNITED STATES PATENT AND TRADEMARK OFFICE
CERTIFICATE OF CORRECTION

| | | |
|---|---|---|
| PATENT NO. | : 8,869,044 B2 | Page 1 of 1 |
| APPLICATION NO. | : 13/283435 | |
| DATED | : October 21, 2014 | |
| INVENTOR(S) | : Silbey et al. | |

It is certified that error appears in the above-identified patent and that said Letters Patent is hereby corrected as shown below:

In the Specification:

Column 8, Line 14, delete "WH®" and insert --Wii®-- therefor;

In the Claims:

Column 11, Claim 1, Line 30, delete "lump" and insert --jump-- therefor;

Column 11, Claim 1, Line 40, delete "lump" and insert --jump-- therefor;

Column 14, Claim 11, Line 37, delete "lump" and insert --jump-- therefor.

Signed and Sealed this
Twenty-fourth Day of March, 2015

Michelle K. Lee
*Director of the United States Patent and Trademark Office*